Figure 1:
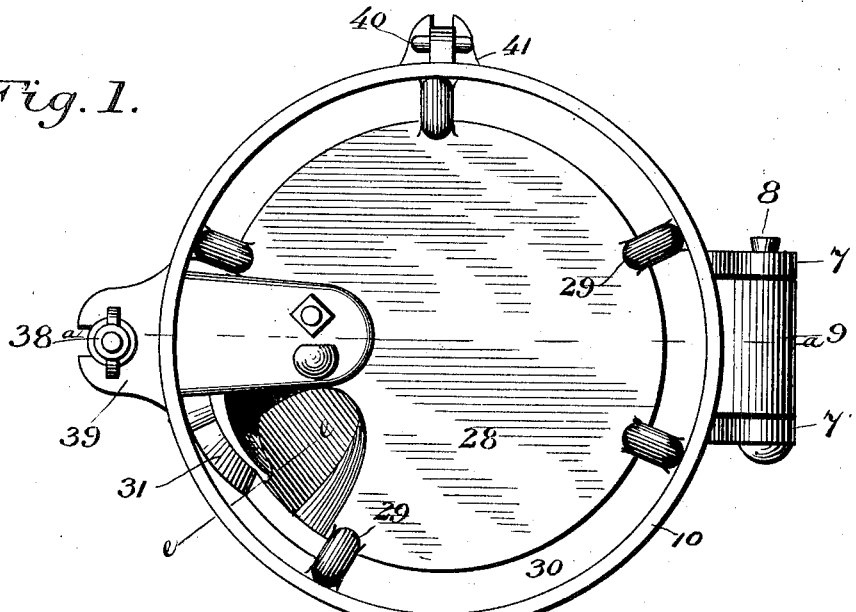

No. 719,237. PATENTED JAN. 27, 1903.
A. C. LINDGREN.
SEED DROPPING MECHANISM.
APPLICATION FILED JULY 15, 1902.
NO MODEL. 4 SHEETS—SHEET 1.

Witnesses
Inventor
A. C. Lindgren
by Pho. T. Dodge
Attorney.

THE NORRIS PETERS CO., PHOTO-LITHO., WASHINGTON, D. C.

No. 719,237. PATENTED JAN. 27, 1903.
A. C. LINDGREN.
SEED DROPPING MECHANISM.
APPLICATION FILED JULY 15, 1902.
NO MODEL. 4 SHEETS—SHEET 2.

No. 719,237. PATENTED JAN. 27, 1903.
A. C. LINDGREN.
SEED DROPPING MECHANISM.
APPLICATION FILED JULY 15, 1902.
NO MODEL. 4 SHEETS—SHEET 3.

Witnesses
Inventor
A. C. Lindgren
by Phil. T. Dodge
Attorney

No. 719,237. PATENTED JAN. 27, 1903.
A. C. LINDGREN.
SEED DROPPING MECHANISM.
APPLICATION FILED JULY 15, 1902.
NO MODEL. 4 SHEETS—SHEET 4.

Witnesses
Inventor
A. C. Lindgren
by Phil. T. Dodge
Attorney

UNITED STATES PATENT OFFICE.

ALEXUS C. LINDGREN, OF MOLINE, ILLINOIS, ASSIGNOR TO THE MOLINE PLOW COMPANY, A CORPORATION OF ILLINOIS.

SEED-DROPPING MECHANISM.

SPECIFICATION forming part of Letters Patent No. 719,237, dated January 27, 1903.

Application filed July 15, 1902. Serial No. 115,663. (No model.)

*To all whom it may concern:*

Be it known that I, ALEXUS C. LINDGREN, of Moline, county of Rock Island, and State of Illinois, have invented a new and useful Improvement in Seed-Dropping Mechanisms, of which the following is a specification.

This invention relates to seed-dropping mechanisms, and more particularly to the type used for planting corn, in which the hopper for holding the corn has in its bottom a rotary ring or plate which receives the kernels from the overlying mass of seed and delivers them into a seed tube or conduit, whence they pass to the ground. In mechanisms of this character the rotary ring or plate which delivers the seed has been formed with seed cells or pockets each of a size to accommodate a single kernel, which kernels are carried by the plate to the point of discharge, where by a suitable valve mechanism they have been accumulated in charges of three or more kernels each and these charges deposited at intervals in the ground in hills. It is of importance that each charge contain the same number of kernels, and by reason of the varying shape and dimensions of the individual grains it frequently happens that either the cells will receive more than a single kernel or none at all, so that there results an irregularity in the size of the charges. To correct this objection, advantage has been taken of the greater uniformity which exists in the thickness of the kernels than in their other dimensions by so forming and shaping the cells of the seed-ring that the kernels could enter the same on edge only and in an upright position and the consequence was, as there was very little variation in the thickness of the kernels, the cells would be filled with certainty and without interruption, so that charges of the same size would be accumulated.

My present invention relates particularly to mechanism constructed on this principle; and it consists in various improvements thereon directed to the form and construction of the seed-cells, the parts immediately overlying the same, and to other details of the mechanism, having in view simplicity of construction and effectiveness, uniformity, and certainty of operation.

Figure 2:
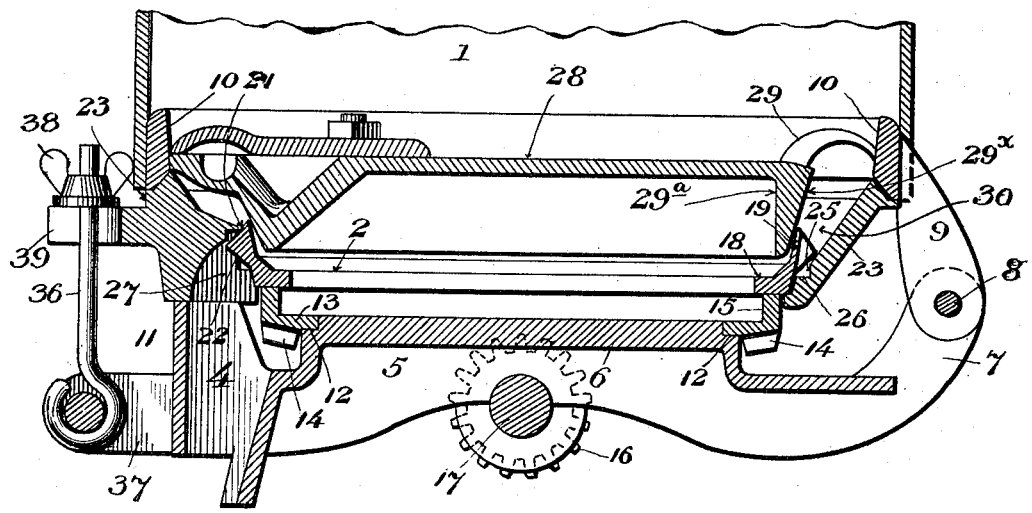
Figure 3:
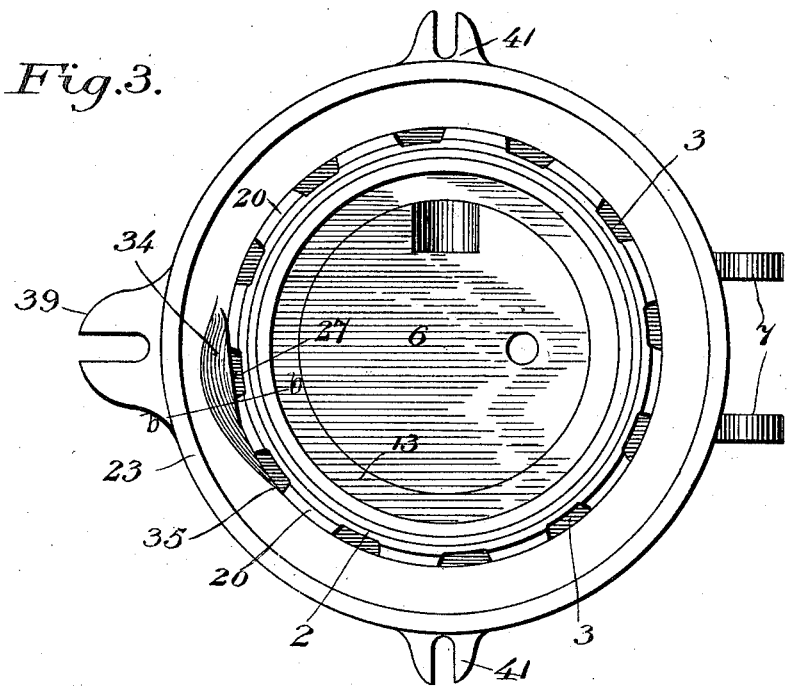
Figure 5:
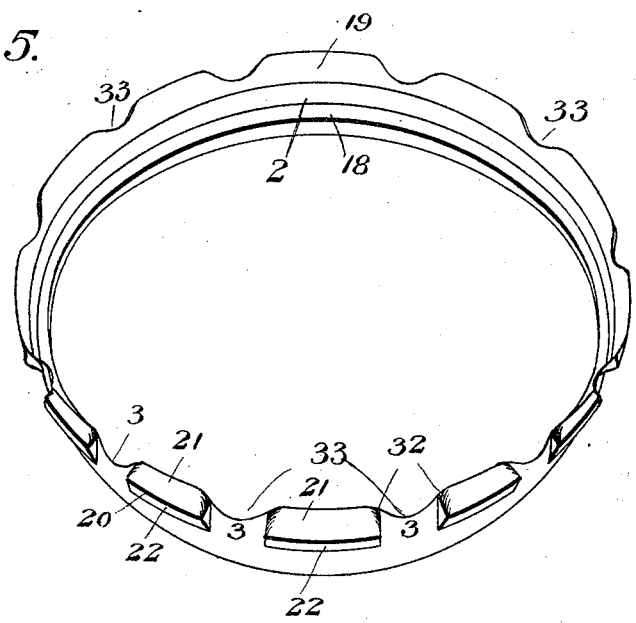
Figure 4:
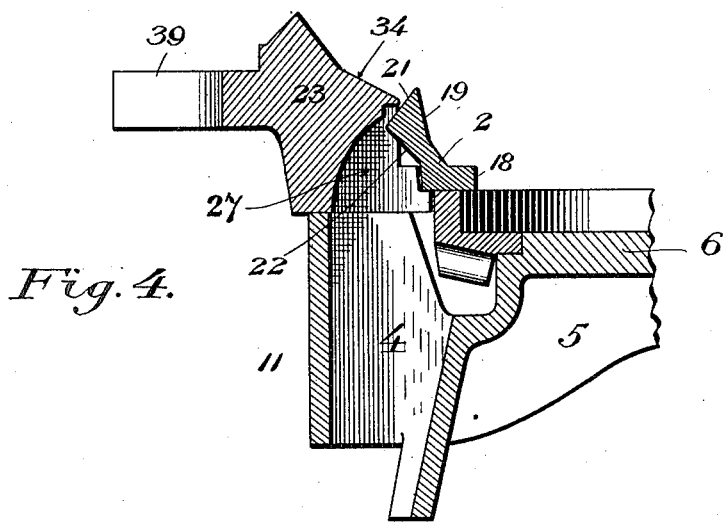
Figure 6:
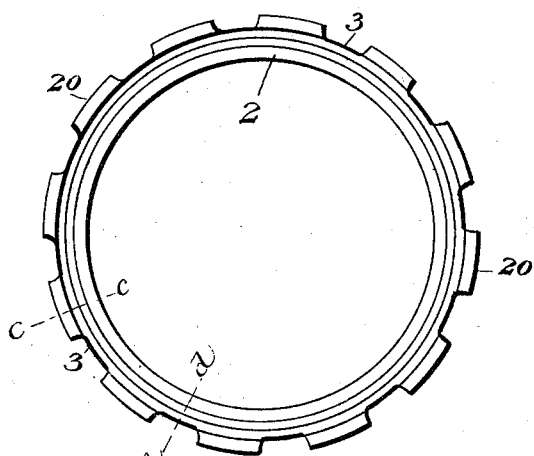
Figure 7:
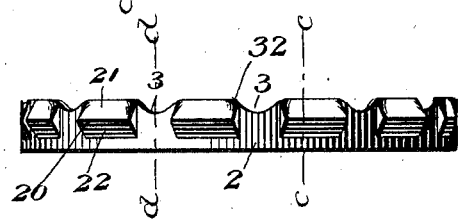
Figure 8:
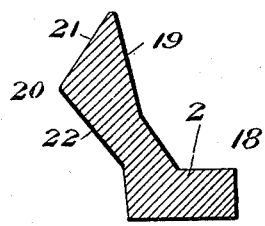
Figure 9:
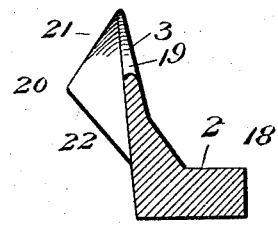
Figure 10:
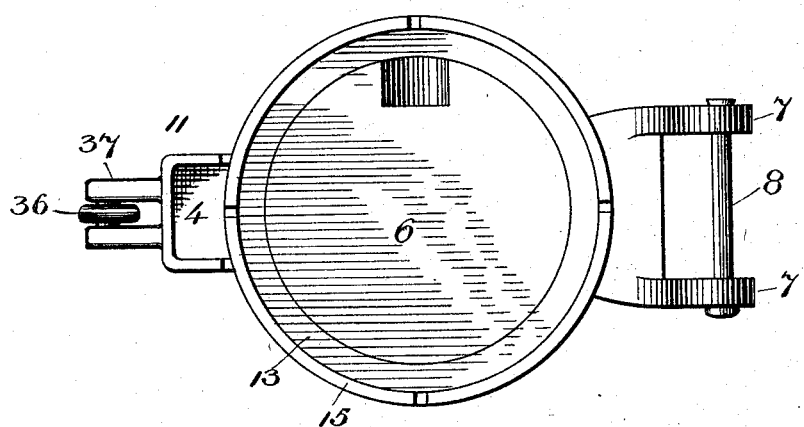
Figure 11:
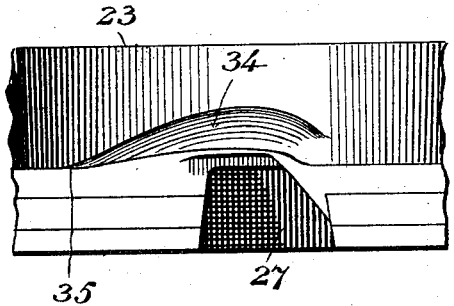
Figure 12:
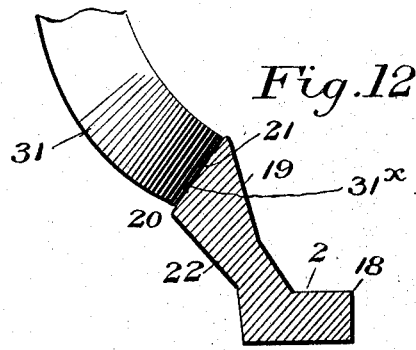

Referring to the drawings, Figure 1 is a top plan view of a seeding mechanism embodying my invention as it appears when looking into the hopper. Fig. 2 is a vertical central section through the same on the line $a\ a$ of Fig. 1. Fig. 3 is a top plan view with the top plate removed to expose to view the seed-ring. Fig. 4 is a vertical sectional elevation, on an enlarged scale, on the line $b\ b$ of Fig. 3. Fig. 5 is a perspective view of the seed-ring removed. Fig. 6 is a top plan view of the same. Fig. 7 is a side elevation of the same. Fig. 8 is a vertical section on the line $c\ c$ of Figs. 6 and 7. Fig. 9 is a vertical section on the line $d\ d$ of Figs. 6 and 7. Fig. 10 is a top plan view of the casting or base-plate which supports the overlying operative mechanism. Fig. 11 is an elevation of the inner side of the bottom ring, showing the discharge-opening therein; and Fig. 12 is a sectional elevation, on an enlarged scale, through the cut-off finger and the seed-ring on the line $e\ e$ of Fig. 1, showing particularly the relation which the under side of said finger bears to the seed-cells.

In the accompanying drawings, 1 represents a hopper to receive a supply of corn and which has in its bottom a seed-discharging mechanism comprising a rotary ring or plate 2, provided with seed-cells 3, each adapted to receive from the mass of seed in the hopper a single kernel in an edgewise position, which kernels are by the rotation of the ring discharged successively through a discharge-opening 4 in a casting or base-frame 5, which is adapted to be secured to the upper end of the seed-conduit of the machine and which gives support to the overlying parts of the seeding mechanism. As shown in Fig. 10, this base-frame is provided with a horizontal flat circular surface 6 and at one side with projecting ears 7, between which is pivoted on a horizontal axis 8 ears 9, projecting from the side of a casting or ring 10, to which the lower edge of the hopper is firmly secured, so that the latter may be tilted back to permit access to the operative parts of the mechanism. The base-frame at a point opposite the ears 7 is formed with the discharge-opening 4, before alluded to, and from around the outer and side edges of this opening there rises a shield 11, the purposes of which will presently appear.

The edge of the flat circular surface 6 is rabbeted, as at 12, and there is fitted in this rabbet, so as to revolve freely, a gear-ring 13, provided on its under side with bevel-teeth 14 and formed above the level of the surface 6 with a ledge 15. The gear-teeth are engaged by a bevel gear-wheel 16, fixed on a transverse shaft 17, mounted in bearings in the under side of the base-frame and receiving motion from any suitable source.

Resting on the upper edge of the ledge of the gear-ring and interlocked therewith for rotation with the ring is the seed-ring 2, before alluded to, which seed-ring is formed with a horizontal base 18 and with a vertical flange 19 at the outer edge of the base, which flange has projecting laterally from it on its outer side a rib 20, with its upper surface 21 sloping upward and inward to the upper edge of the vertical flange and its lower surface 22 sloping downward and inward at the same inclination and joining the body of the ring about on a level with the upper face of the base portion. At intervals this sloping rib is cut away to a depth equal to the outward projection of the rib, which cut-away portions form a series of seed-cells, each closed at the inner side by the vertical flange of the ring and at its ends by the adjacent ends of the ribs, the outer and under sides of the cells being open. Closely surrounding this seed-ring is a fixed bottom ring or casting 23, which rests on the upper edge of the shield 11 at one side and is supported by the ears 7 at the opposite side, and from its lower edge this ring rises at an outward slope or inclination and terminates at a point where it will give support to the lower edge of the hopper-ring 10, as shown in Fig. 2. The inner surface of this bottom ring inclines inward and downward to the outer edge or apex of the sloping rib 20 of the seed-ring, whence it extends vertically downward, as at 25, to a point on a level with the lower edge of the rib, and from this point it extends inward, as at 26, horizontally to the outer surface of the base of the seed-ring and is formed with an annular rabbet, which receives and closely surrounds the lower edge of the ring. From this construction it will be observed that the bottom ring in its relation to the seed-ring, as described, constitutes the outer sides or walls of the cells 3 and also the bottoms of the same, and the width of the cells radially as determined by the horizontal thickness of the rib is such that they will receive the kernels only in an edgewise position. The kernels extending on edge in the cells will be carried around as the seed-ring rotates, supported by the horizontal surface 26 of the bottom ring, until the point of delivery vertically over the discharge-opening 4 is reached, at which point the bottom ring has its inner side, including the vertical and horizontal surfaces 25 and 26, cut away or interrupted, as at 27, and through this opening the kernels drop and enter the discharge-opening 4, whence they pass into the seed-conduit. It is seen that the effect of the interruption or cutting away of the surfaces 25 and 26 is to remove the outer wall and bottom of the seed-cells when they reach the point of delivery, and the main support of the kernels in the cells being thus removed they will readily leave the cells, so that a knocker will not be necessary to dislodge them.

The interior of the seed-ring is covered by a fixed top plate 28, connected at intervals by arms 29 with the hopper-ring 10, and this plate is formed on its edge with a depending flange $29^a$, having its upper edge on a level with the upper edge of the bottom ring 23 and extending downward at an inward inclination snugly within the vertical flange of the seed-ring. The outer surface $29^x$ of this depending flange on the top plate forms, in conjunction with the inner surface of the bottom ring, an annular channel 30 above the seed-cells, with walls inclining inward and downward and converging, the wall $29^x$ being of less inclination than the opposite one. The channel thus formed is of a width which will permit the seed to lie and settle indiscriminately and in haphazard positions, and its sloping walls tend to direct the seed downward where they will enter the cells. As the seed-ring rotates the upper inclined surface 21 of the sloping ribs agitates the seed in the bottom of the channel 30 and shifts them and turns them over with their flat sides against either of the two inclined sides of the channel, by which they will be directed in this position into the cells.

Just in advance of the opening 27 through the bottom ring 23 a cut-off finger 31, Figs. 1 and 12, overlies the seed-cells and has its under side inclined downward and outward, as at $31^x$, to conform to and closely overlie the inclined surface 21 of the ribs, and the function of this cut-off is to remove any surplus or extra kernels which may be carried toward the point of the delivery with the kernel which is occupying a cell, so as to prevent more than one kernel being carried by each cell. This action of the cut-off finger is facilitated by the peculiar form of the cells, as shown in Figs. 5, 6, and 7, where it will be seen that the ends of the sloping ribs 20, which constitute the end walls of the cells, are rounded on their upper sides, as at 32, which rounded surfaces permit the extra kernel to be pushed back freely by the cut-off, whereas if there was an abrupt edge at the end of the cell there would be danger of the grain becoming jammed between the same and the end of the finger. Furthermore, these rounded surfaces assist the grains in entering the cells by directing them downward therein.

The upper edge of each cell is curved inward or depressed, as at 33, the effect of which is to widen the cell at this point, so that there will be room for the entrance of kernels of abnormal thickness.

In order that in the event of the passage beneath the cut-off finger of extra kernels they will be prevented from passing through the opening 27 with the kernels from the cells, I form on the inner surface of the bottom ring over the opening 27 a raised surface 34, Figs. 3, 4, and 11, which raised surface slopes gradually upward from a point in front of the cut-off finger, reaches its highest point vertically over the opening 27, and then slopes downward and joins the inner surface of the ring, as at 35. This raised surface is so formed and shaped in relation to the seed-ring that the upper edge of the latter will project slightly above the inner edge of the surface at its highest point, as clearly shown in Fig. 4, the result being that as the ring rotates the sloping ribs will engage the extra corn and push the same along the raised surface, by which the grains will be guided and directed over the opening 27 and will finally be delivered into the mass of corn in the channel 30 beyond the point of discharge.

The bottom ring is held in position on the base-frame by means of a clamping-bolt 36, Fig. 2, mounted loosely at one end between ears 37 on the base-frame and provided on its opposite end with a thumb-nut 38, adapted to engage the upper surface of a slotted lug 39 on the bottom ring. The hopper-ring is held in position on the bottom ring by means of two clamping-bolts 40, pivoted to the sides of the hopper-ring and adapted to engage lugs 41 on the sides of the bottom ring.

In the operation of the mechanism described, the parts being assembled as shown and locked together by the clamping-bolts, a supply of corn is placed in the hopper and the grains settle in the channel 30 above the seed-cells in indiscriminate positions. Motion being imparted to shaft 17, the seed-ring is caused to rotate, and in doing so the grains in proximity will be agitated by the sloping ribs 20 and will be turned and changed in position, finally with their sides against either of the two inclined walls of the channel or the inclined upper surface of the rib, and will be directed into the seed-cells in an edgewise position, in which position they will be carried by the cells, supported by the horizontal surface 26 and the vertical surface 25 of the bottom ring. As the cells approach the cut-off the surplus grains will be pushed back, and as the kernels in the cells reach the opening 27 in the bottom ring, the bottom and side supports 25 and 26 being interrupted, the kernels will drop through the opening and enter the seed-conduit. In the event of any of the grains passing under the cut-off these will be pushed along by the cells on the raised surface 34 and passing above the opening 27 will finally enter the channel beyond the point of delivery. It is seen, therefore, that from the mass of grain overlying the rotary seed-ring the kernels will enter with unfailing certainty, one in each cell, in an edgewise position and will be carried in the cells to the point of delivery, and by reason of the peculiar form of the cells and the coöperation of the cut-off and the raised surface 34 there will be no liability of the delivery of more than one grain by each cell.

By the expression "seed-plate," which I have uniformly employed in the claims, is meant the rotary member 2, in which the seed-cells are formed, which member is variously termed in this art "seed-cup," "seed-plate," "seed-ring," &c. It is the intention that the expression "seed-plate," used in the claims, embrace all these different and alternate designations.

Having thus described my invention, what I claim is—

1. In a seed-dropper the combination with a hopper-bottom having a channel with converging sides both sloping inward and downward, of a rotary seed-plate provided with seed-cells at the bottom of said channel.

2. In a seed-dropper the combination with a hopper-bottom provided with a channel having both its sides sloping downward and inward, with the inner side at less inclination than the outer side, of a rotary seed-plate provided with cells at the bottom of said channel.

3. In a seed-dropper the combination with the hopper-bottom having a downwardly and inwardly sloping surface 30, of a seed-plate formed with an upright flange and with seed-cells, and a top plate fitting into said vertical flange and formed above the flange with a surface $29^\times$ extending upward and outward and opposite the surface 30 and constituting in connection with said surface 30, an annular channel above the seed-cells.

4. In a seed-dropper the combination with a base-frame provided with a discharge-opening for the seed, of a bottom ring supported thereby and separable therefrom and formed with an opening coincident with that in the base-frame, a seed-plate arranged to deliver its seed into said opening in the bottom ring, and a hopper sustained by the said bottom ring above said parts.

5. In a seed-dropper the combination with a hopper, of a base-frame provided with a discharge-opening and with a horizontal circular surface 6 inward of the opening, a gear-ring fitted to revolve on said surface situated inward of the discharge-opening, a seed-plate situated on and revoluble with the gear-ring and provided with seed-cells, a bottom ring surrounding the seed-plate and supported by the base-frame, and formed with an opening coincident with that in the bottom ring, and a top plate fitting into the said seed-plate.

6. In a seed-dropper the combination with the hopper-bottom, of a rotary seed-plate therein formed with a laterally-extending rib with an upper upwardly and inwardly extending surface 21 cut away vertically at intervals to form seed-cells, and a top plate having an outer surface extending from the upper edge of said surface 21 at an upward and outward inclination.

7. In a seed-dropper the combination with a base-frame having a discharge-opening and a vertical shield rising therefrom, of a bottom ring resting on the shield and formed with a coincident opening, and a rotary seed-plate adapted to deliver the kernels through the opening in the bottom ring.

8. In a seed-dropper the combination with a hopper-bottom having a discharge-opening therein, of a rotary seed-plate provided with cells adapted to deliver into the discharge-opening, said bottom being provided above the discharge-opening with a surface projecting inward beyond the general inner surface of the bottom, said projecting surface having its inner edge terminating adjacent to the path of the seed-cells.

9. In a seed-dropper the combination with a hopper-bottom having a discharge-opening therein, of a rotary seed-plate having cells adapted to deliver into the discharge-opening, a cut-off in advance of the opening, and means for preventing the entrance into the discharge-opening of any surplus grains passing by the cut-off.

10. In a seed-dropper the combination with the hopper-bottom having a discharge-opening, of a rotary seed-plate adapted to deliver the grains into said opening, a cut-off in advance of the opening, and means for conveying beyond the opening and delivering into the mass of seed in the hopper, any surplus grains passing the cut-off.

11. In a seed-dropper the combination with the hopper-bottom having a discharge-opening, of a projecting surface sloping upward and inward above the discharge-opening, and a seed-plate formed with seed-cells adapted to deliver the grains into the discharge-opening, said plate having its upper edge projecting above the edge of said projecting surface.

12. In a seed-dropper the combination with the hopper-bottom having a discharge-opening, of a seed-plate having cells arranged to deliver into said opening, the said bottom being formed adjacent to the opening with a projecting surface disposed with relation to the seed-plate that the latter will push along said surface surplus kernels carried by the seed-plate and lying outside the cells.

13. In a seed-dropper the combination with a hopper-bottom, of a seed-plate having a laterally-projecting rib inclined on its upper side and cut away at intervals to form seed-cells, and a cut-off finger having its under surface inclined to conform to that of the rib and lying flatly against the same.

14. In a seed-dropper, the combination with the hopper-bottom having an annular channel therein to receive the seed in indiscriminate positions, of a seed-plate formed with cells at the bottom of said channel and with solid surfaces between the cells extending across the channel, and a cut-off finger extending down into the channel and closely overlying the solid portions of the seed-plate between the cells.

15. In a seed-dropper, a seed-plate provided with an upright flange having on its outer surface a rib with an upper surface inclining upward and inward and a lower surface inclining downward and inward and cut away at intervals to form seed-cells.

16. In a seed-dropper, a rotary seed-plate having seed-cells therein, with the upper edge of said cells formed with a surface inclined downward in the direction of movement of the plate.

17. In a seed-dropper, a rotary seed-plate having in its outer side seed-cells, with the upper edge of said cells curved downward between the end walls of the same.

18. In a seed-dropper, a rotary seed-plate having a vertical flange provided on its outer side with a projecting rib having its upper side sloping downward and outward from the upper edge of the flange and cut away at intervals to form seed-cells, the upper edge of said cells being depressed between adjacent sections of the rib.

19. In a seed-dropper a seed-plate provided with a projecting rib cut away at intervals to form open-sided seed-cells, the ends of the sections of the ribs being rounded downward toward the cells.

20. In a seed-dropper, a seed-plate having on its outer side a projecting rib formed with open-sided seed-cells at intervals, said cells having their end walls curved downward and inward.

In testimony whereof I hereunto set my hand, this 17th day of June, 1902, in the presence of two attesting witnesses.

ALEXUS C. LINDGREN.

Witnesses:
  P. M. PRICE,
  L. C. BLANDING.